United States Patent [19]

Skarsten

[11] Patent Number: 4,875,513
[45] Date of Patent: Oct. 24, 1989

[54] PORTABLE WORK BENCH

[75] Inventor: Stephen R. Skarsten, Welwyn, Great Britain

[73] Assignee: Skilten Tools Limited, Hertfordshire, United Kingdom

[21] Appl. No.: 183,154
[22] PCT Filed: Jul. 15, 1987
[86] PCT No.: PCT/GB87/00501
 § 371 Date: Apr. 8, 1988
 § 102(e) Date: Apr. 8, 1988
[87] PCT Pub. No.: WO88/00514
 PCT Pub. Date: Jan. 28, 1988

[30] Foreign Application Priority Data

Jul. 15, 1987 [GB] United Kingdom ............... 8617216

[51] Int. Cl.⁴ ............................................. B27C 9/00
[52] U.S. Cl. .................................. 144/286 R; 83/574;
 108/83; 108/90; 144/1 R; 144/287
[58] Field of Search ................ 83/574; 144/1 R, 285,
 144/286 R, 286 A, 287; 108/83, 87, 90, 8, 113

[56] References Cited

U.S. PATENT DOCUMENTS

| 3,734,151 | 5/1973 | Skripsky | 144/1 R |
|---|---|---|---|
| 4,186,784 | 2/1980 | Stone | 144/1 R |
| 4,236,599 | 12/1980 | Luff et al. | 144/286 R |
| 4,265,283 | 5/1981 | Nash et al. | 144/1 R |
| 4,350,193 | 9/1982 | McCambridge et al. | 144/1 R |
| 4,635,692 | 1/1987 | Hulse et al. | 144/1 R |
| 4,733,704 | 3/1988 | Wolff | 144/1 R |

FOREIGN PATENT DOCUMENTS

| 0015400 | 9/1980 | European Pat. Off. . |
| 0098101 | 1/1984 | European Pat. Off. . |
| 0148617 | 7/1985 | European Pat. Off. . |
| 2819033 | 11/1979 | Fed. Rep. of Germany . |
| 2530936 | 2/1984 | France . |
| 2076737 | 7/1984 | United Kingdom . |

Primary Examiner—W. Donald Bray
Attorney, Agent, or Firm—Browdy and Neimark

[57] ABSTRACT

A portable work bench (10) has two wooden bench top parts (22, 23) mounted on a collapsible support frame (14). One bench top part (22) has an opening (26) normally covered by a wooden cover plate (30). To convert the bench into a power tool bench, the cover plate is replaced by an insert plate (36) having a power tool (such as a circular saw) bolted beneath it. The cutting element of the power tool projects through an opening in the insert plate to cut a work piece supported on the bench top.

7 Claims, 2 Drawing Sheets

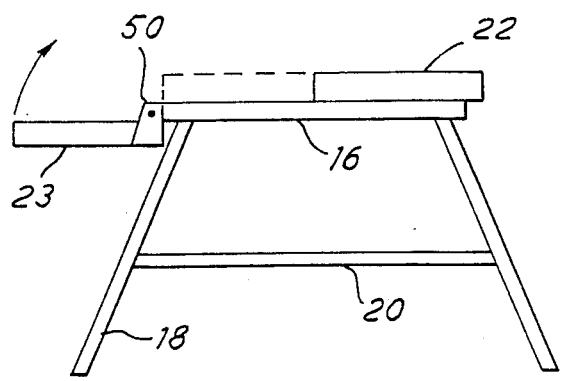
FIG. 4
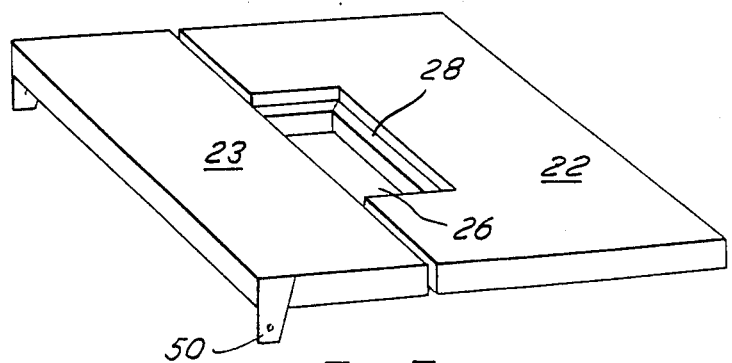
FIG. 5
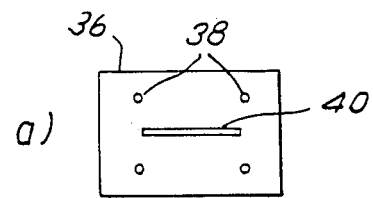
a)
FIG. 6
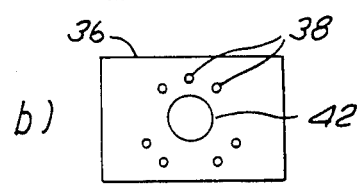
b)

PORTABLE WORK BENCH

This invention relates to portable work benches.

It is well known that a useful work bench can be produced by mounting a wooden bench top upon a collapsible support structure. The bench top may be in two separable parts. A vice mechanism is usually provided; this may be a separate element mounted on the bench top or may incorporate the separable bench top parts as vice jaw members.

A wide variety of hand held power tools are available for wood working and allied purposes. These tools are produced by many different manufacturers and include circular saws, jig saws, routers and powered planers. For more serious D.I.Y. or professional use, working tables are available which provide a mounting for the power tool. Thus, taking the circular saw as an example, saw tables are available which have a circular saw mounted beneath a working surface, the saw blade projecting through a slot in that surface.

It is an object of this invention to provide a more versatile work bench which may be used in one mode as a work bench for hand tool operations and be used in another mode to provide a fixed mounting for a power tool.

Accordingly, the present invention consists in one aspect in a work bench top assembly comprising a bench top adapted for mounting on a supporting structure and having an aperture therein; a removable cover plate receivable in the aperture to define with the bench top a substantially continuous working surface and an insert plate receivable in the aperture in substitution for the cover plate, the insert plate having a tool opening and mounting means for mounting a power tool beneath the insert plate in such a manner that the powered tool element of the power tool extends through the tool opening for operations upon a work piece supported on the bench top.

Advantageously, the bench top and the removable cover plate are formed principally of wood and the insert plate is formed principally of metal.

Suitably, the bench top is formed of two separable parts abutting at a join line, the aperture being positioned as to open to said join line.

Preferably, the mounting means on the insert plate are adapted for engagement with a plurality of different power tools.

In the preferred form of this invention, with a bench top and cover plate both of wood defining together a substantially continous working surface, the portable work bench can be used in conventional manner with hand held tools, whether powered or not. By replacing the cover plate by an insert plate having mounted thereto a power tool such as a circular saw, the work bench according to this invention is converted in a very simple fashion to a power bench.

This invention will now be described by way of example with reference to the accompanying drawings in which:

FIG. 4 is a side view of a modified portable work bench according to this invention;

FIG. 5 is a perspective view of the bench top for use with the work bench shown in FIG. 4; and FIGS. 6A and 6B are plan views of alternative insert plates for use with the work benches shown in FIG. 1 or FIG. 4.

Figure 1:
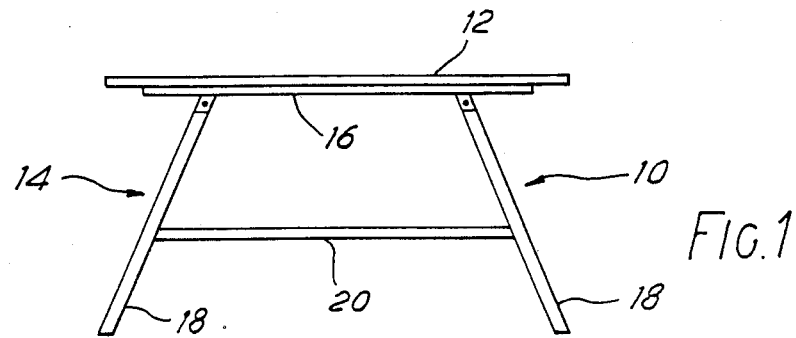
FIG. 1 is a front view of a portable work bench according to this invention.

The work bench shown at 10 in FIG. 1 comprises a bench top 12 and a collapsible suport structure 14. The structure 14 comprises a frame 16 secured to the underside of the bench top and two leg assemblies 18 pivotally mounted at opposite ends beneath the frame. A bracing member 20 extends between the two leg assemblies; this may take the form of a removable shelf or a linkage which folds as the structure is collapsed.

Figure 2:
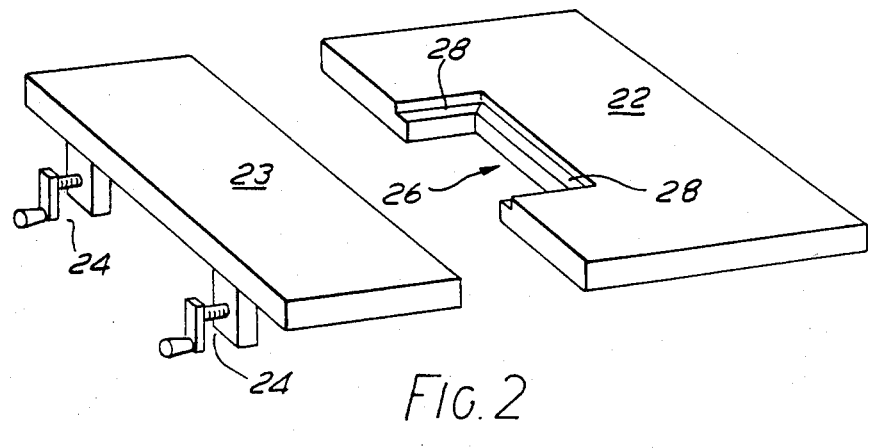
FIG. 2 is a perspective view of the bench top forming part of the work bench shown in FIG. 1.
Figure 3:
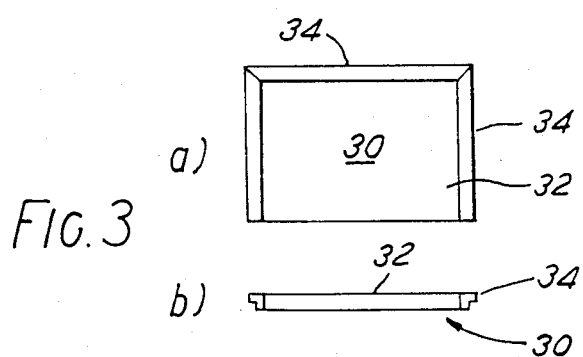
FIGS. 3A and 3B are respectively plan and front views of a removable cover plate for use with the bench top of FIG. 2.

The bench top, as shown in FIG. 2, is formed in two separable parts. One part 22 is rigidly secured to the frame 16 whilst the other 23 is movable with respect to the frame through the action of a vice mechanism shown generally at 24. the details of the vice mechanism form no part of this invention and need not be described in detail.

The bench top part 22 is formed with a rectangular cut-out 26 which opens to the join-line of the two bench top parts. The three sides of the thus defined aperture lying within the bench top part 22 are providedwith a shoulder 28. A removable cover plate 20 is receivable in the aperture 26 and comprises a rectangular wooden block 32 having metal angle pieces 34 secured along three sides. These angle pieces engage with the shoulder 28 so that the cover plate is received as a close fit within the aperture. It will be recognised that the cover plate presents a wooden edge to the opposing part of the bench top so that there is no risk of damage to clamped work pieces. It may be desirable to ensure that the angle pieces which extend normally to the bench join-line terminate slightly short of the join-line to avoid the risk of damage to work pieces after wear to the opposing bench top edges.

To convert the work bench to a power bench, the cover plate 30 is removed and replaced by an insert plate such as that shown at 36 in FIG. 6A. This is formed of metal and is of the appropriate shape and dimension to be received as a close fit in the aperture 26 resting upon the shoulder 28. This insert plate is provided with countersunk screw mounting holes shown schematically at 38 to enable the circular saw from a variety of manufacturers to be rigidly secured beneath the insert plate. It will be understood that a suitable pattern of mounting holes or other mounting means are provided with the appropriate selection being made for use with the particular design of circular saw. The circular saw blade projects through a slot 40 in the insert plate to enable cutting of work pieces supported on the bench top. Further mounting means (not shown) may be provided to enable a guide rail to be affixed to the insert plate 36, that guide rail then assisting in movement of a work piece in a straight line over the bench top.

An alternative form of insert plate as shown at 36 in FIG. 6B is intended for use with the router tool. It has circular orifice 42 and, again, a suitable pattern of countersunk or counter bored screw holes 38. Further insert plates may be provided for use, for example, with powered planers. Alternatively, one insert plate may be provided which is suitable for use with a range of different power tools, it being more convenient in such an arrangment to restrict the mounting means to those necessary for the tools of a single manufacturer.

In an alternative form of work bench shown in FIGS. 4 and 5, one bench top part 22 is, as before, secured rigidly to the frame 16 but the other bench part 22 is supported on cranked hinge plates 50. In this arrangement the bench top parts do not form a vice mechanism. The bench top part 23 can be used in either of two positions. In the first position shown in FIG. 5 and in dotted outline in FIG. 4, it abuts the fixed bench top part 22, whilst in the other position it is turned through 180° and serves as a shelf.

A separate vice is provided and has locating pegs which can be received within any of a number of locating holes provided in a suitable array over both bench top parts. The vice has fixed and movable jaws and may be used to clamp a work piece between the jaws or between the movable jaw and one or more jig pieces received in appropriate locating holes. Advantageously, locating holes are also provided in that part of the frame which is exposed upon movement of the bench top part 23 to the shelf position so that the vice can be positioned directly on the frame and used in conjunction with the opposing edge of the fixed bench top part 22.

The bench top in this form of the invention is provided with a rectangular aperture 26 and is used with a cover plate and one or more insert plates as described above in relation to the previous embodiment.

In a still further embodiment of this invention, not shown in the drawings, one bench top part rests on the frame and is located by pegs projecting from the underside of the bench top part into locating holes in the frame part. This part of the bench top can then, if desired, be simply removed from the work bench.

This invention provides a work bench which has considerable versatility. It may be used, in one form, as a conventional portable work bench with the versatility not impairing, to any significant extent, the capability of the work bench. When required, an insert plate can be substituted for the cover plate, that insert plate being either already mounted to a power tool or being readily affixable to such a power tool. As the insert plate is formed of metal, it provides the necessary strength notwithstanding the existence of an orifice and a number of screw mounting holes.

It should be understood that this invention has been described by way of example only and a wide variety of modifications can be made without departing from the scope of the invention. Thus, for example, the insert plate can take shapes other than rectangular and can be held in position by means other than the described shoulder. The described arrangement in which the aperture is open to the join line of two separable bench top parts has the advantage that replacement of the cover plate by an insert plate is facilitated, particularly where that insert plate already carries a power tool. It will be possible, however, to provide an aperture which is wholly contained within an integral bench top or bench top part or which is open to a free edge of the bench top. In the latter arrangement, separate means may be desirable to lock the insert and cover plates with respect to the bench top. If desired, a bench top assembly according to this invention can be provided for mounting upon an existing support structure. For example, a bench top part having an aperture opening to one edge and accompanied by a cover plate and one or more insert plates could be supplied for mounting on an existing portable work bench. The new bench top part would then replace the existing fixed bench top part.

I claim:

1. A work bench top assembly comprising a bench top adapted for mounting on a supporting structure and having an aperture therein; a removable cover plate receivable in the aperture to define with the bench top a substantially continuous working surface and an insert plate receivable in the aperture in substitution for the cover plate, the insert plate having a tool opening; and mounting means for mounting a power tool beneath the insert plate in such a manner that the powered tool element of the power tool extends through the tool opening for operations upon a work piece supported on the bench top, wherein the bench top is formed of two separable parts abutting at a join line, said aperture being positioned as to open to said join line.

2. An assembly according to claim 1, wherein the bench top and the removable cover plate are formed principally of wood and wherein the insert plate is formed principally of metal.

3. An assembly according to claim 1, wherein the mounting means on the insert plate are adapted for selective engagement with a plurality of different power tools.

4. An assembly according to claim 1, wherein there are provided a plurality of different insert plates each adapted for mounting with a different power tool.

5. An assembly according to claim 1, wherein the thickness of the insert plate is less than that of the bench top and wherein a shoulder is formed around at least part of the aperture to support said insert plate.

6. A work bench comprising an assembly according to claim 1 together with a supporting structure upon which said bench top is mounted.

7. A work bench comprising a supporting structure; a bench top mounted on the supporting structure and having an aperture therein; a removable cover plate receivable in the aperture to define with the bench top a substantially continuous working surface and an insert plate receivable in the aperture in substitution for the cover plate, the insert plate having a tool opening; and mounting means for mounting a power tool beneath the insert plate in such a manner that the powered tool element of the power tool extends through the tool opening for operations upon a work piece supported on the bench top, wherein the bench top is formed of two separable parts, abutting at a join line, one rigidly secured to the supporting structure, the other mounted on the supporting structure for pivotal movement about an axis parallel to said join line.

* * * * *